United States Patent
Kalva et al.

(10) Patent No.: US 10,798,440 B2
(45) Date of Patent: *Oct. 6, 2020

(54) METHODS AND SYSTEMS FOR SYNCHRONIZING DATA STREAMS ACROSS MULTIPLE CLIENT DEVICES

(71) Applicant: Facebook, Inc., Menlo Park, CA (US)

(72) Inventors: Madhu Kishore Kalva, Foster City, CA (US); Peter Aubrey Bartholomew Griess, Dallas, TX (US); Yichuan Huang, San Jose, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/553,041

(22) Filed: Aug. 27, 2019

(65) Prior Publication Data

US 2020/0029117 A1   Jan. 23, 2020

Related U.S. Application Data

(63) Continuation of application No. 16/041,516, filed on Jul. 20, 2018, now Pat. No. 10,397,636.

(51) Int. Cl.
*H04N 5/932* (2006.01)
*H04N 21/43* (2011.01)
(Continued)

(52) U.S. Cl.
CPC ....... *H04N 21/4307* (2013.01); *H04L 65/604* (2013.01); *H04L 65/608* (2013.01)

(58) Field of Classification Search
CPC ....... H04N 21/26258; H04N 21/47217; H04N 21/262; H04N 21/2387; H04N 21/8456;
(Continued)

(56) References Cited

U.S. PATENT DOCUMENTS 10,397,636 B1 * 8/2019 Kalva .............. H04N 21/23439
2006/0222320 A1   10/2006 Bushell et al.
(Continued)

OTHER PUBLICATIONS

Kalva, Notice of Allowance, U.S. Appl. No. 16/041,516, dated Apr. 19, 2019, 9 pgs.

*Primary Examiner* — Robert Chevalier
(74) *Attorney, Agent, or Firm* — Morgan, Lewis & Bockius LLP

(57) ABSTRACT

A server system includes one or more processors, a clock, and memory. The memory stores one or more programs configured for execution by the one or more processors. The server system receives a program manifest (e.g., a playlist) for a video from a content delivery network. The video includes a plurality of video segments. The server system parses the program manifest to identify a timeline for the video, then determines the current playback position for the video and a corresponding initial timestamp according to the clock. The server system periodically updates the current playback position for the video according to the clock and the initial timestamp. Over a span of time the server system receives requests from a plurality of client devices to view the video. For each request from a respective client device, the server system sends the current playback position to the respective client device.

20 Claims, 10 Drawing Sheets

(51) Int. Cl.
*H04L 29/06* (2006.01)
*H04N 5/93* (2006.01)

(58) Field of Classification Search
CPC .. H04N 21/4307; H04L 65/604; H04L 65/608
USPC ....... 386/201, 278, 281, 290, 326, 323, 239, 386/241
See application file for complete search history.

(56) References Cited

U.S. PATENT DOCUMENTS

| | | |
|---|---|---|
| 2010/0066905 A1 | 3/2010 | Avishay |
| 2014/0281996 A1 | 9/2014 | Paulraj et al. |
| 2016/0066007 A1* | 3/2016 | Zhang ............. H04N 21/26258 725/116 |
| 2019/0098362 A1 | 3/2019 | Gutman |
| 2019/0297370 A1* | 9/2019 | Afshar ............. H04N 21/25825 |

* cited by examiner

```
#EXTM3U
#EXT-X-VERSION:3
#EXT-X-TARGETDURATION:7
#EXT-X-MEDIA-SEQUENCE:40078
#EXT-X-PROGRAM-DATE-TIME:2018-05-16T02:10:14.809+00:00
#EXT-X-KEY:METHOD=AES-128,URI="https://nextvrpublic.blob.core.windows.net/public
#EXTINF:6.006,
media-uydniwdv5_b4128000_40078.ts
#EXTINF:6.006,
media-uydniwdv5_b4128000_40079.ts
#EXTINF:6.006,
media-uydniwdv5_b4128000_40080.ts
#EXTINF:6.006,
media-uydniwdv5_b4128000_40081.ts
#EXTINF:6.006,
media-uydniwdv5_b4128000_40082.ts
```

METHODS AND SYSTEMS FOR SYNCHRONIZING DATA STREAMS ACROSS MULTIPLE CLIENT DEVICES

CROSS-REFERENCE TO RELATED APPLICATIONS

This application is a continuation of U.S. patent application Ser. No. 16/041,516, filed Jul. 20, 2018, entitled "Methods and Systems for Synchronizing Data Streams Across Multiple Client Devices," which is incorporated by reference in its entirety.

TECHNICAL FIELD

This application relates generally to synchronizing data and/or video streams across multiple client devices.

BACKGROUND

Social media and social-networking have gained tremendous traction. More users are uploading video content to their respective social media pages and sharing the video content with their friends, families, and fans. The growing base of mobile device applications available to users satisfies a wide range of needs, providing users with both a source of entertainment and a variety of convenient features and functionality. Additionally, virtual-reality, augmented-reality, and mixed-reality platforms allow multiple users to experience virtual content. Users of a live streaming video service may use a virtual/augmented/mixed reality platform to view such videos.

The number of users of live streaming video has been growing. In many cases, the exact timing of the stream for individual users is not important because the users are in separate locations. However, when there are multiple users viewing the same live video in proximity (e.g., at a live event or at a sports bar), synchronizing the video can be critical. Given the number of users tuning into live videos, real-time synchronization is important for delivering a consistent video watching experience.

SUMMARY

During live video streaming, viewers may be out of synchronization for a variety of reasons. In some live video systems, the video stream is broken into segments (e.g., 5-second segments). When a user logs in, the default behavior is to begin at the start of the current segment. In this way, different users can be out of sync up to the size of the segments. In some circumstances, even a five-second difference can be critical, especially for exciting moments in the video (e.g., a player scoring a touchdown or a comedian delivering a punchline).

Users can get out of sync for other reasons as well, such as different network latency to different client devices.

Accordingly, there is a need for methods, systems, and interfaces for providing synchronized video streams to multiple client devices for multiple users.

In accordance with some embodiments, an electronic device (e.g., a client device) has one or more processors, a display, and memory. The memory stores one or more programs configured for execution by the one or more processors. The electronic device receives, from a content delivery network, a program manifest including one or more video segments of a video and parses the program manifest to identify a timeline for the video that spans the video segments. The electronic device receives, from a social-networking server, a playback offset for the video. In accordance with the playback offset and the timeline for the video, the electronic device determines a designated video segment and a playback position within the designated video segment. The electronic device then plays the video segments sequentially on the electronic device, commencing at the playback position within the designated video segment.

In general, a client device continues to receive messages from the social networking server that specify where in the video each user should be. In this way, any conditions that would cause a user to get out of sync are corrected dynamically. In some embodiments, the received playback offset is a first playback offset, and the electronic device receives a second playback offset from the social networking system. The electronic device determines an execution offset corresponding to a current playback position in the playing video. When the difference (e.g., absolute difference) between the execution offset and the second playback offset is less than a threshold value (e.g., 1 second), the device continues to play the video uninterrupted at the execution offset. On the other hand, when the difference between the execution offset and the second playback offset is greater than the threshold value, the electronic device jumps to the appropriate location. In particular, the electronic device determines a second designated video segment and a second playback position within the second designated video segment in accordance with the second playback offset and the timeline for the video. The electronic device then switches to playing the video segments at the second playback position within the second designated video segment.

In some embodiments, the electronic device receives a plurality of playback offset options, each corresponding to a different bitrate. The multiple options can address the fact that messages received from the server will take different amounts of time depending on the bandwidth/connectivity between the server and the client device. For example, the video playlist may contain multiple representations of the video (e.g., a high resolution version and a low resolution version). The client device may select an appropriate video resolution to play that matches the available bandwidth to the content delivery network. The social networking server provides a distinct playback offset for each available bitrate so that the client device can use the appropriate one. In this way, the received playback offset is sometimes one of a plurality of playback offset options, each corresponding to a respective bitrate. In some embodiments, the electronic device determines network bandwidth, speed, and or latency at the electronic device, and correlates the network data with a first bitrate. The electronic device determines the designated video segment and the playback position within the designated video segment in accordance with the playback offset option corresponding to the first bitrate.

In some embodiments, the timeline for the video includes a starting time specified in the manifest. In some embodiments, the timeline for the video includes an ending time that equals the starting time plus a sum of time lengths of the plurality of video segments.

In some embodiments, the timeline for the video has a starting time of 0 when the manifest does not specify a starting time. In some embodiments, the timeline for the video has an ending time that equals a sum of time lengths of the plurality of video segments.

In some embodiments, the playback offset is specified as an offset from a starting time of the video timeline. In some embodiments, the playback offset is specified as a time that falls within a range specified by the video timeline.

In some embodiments, the one or more video segments comprise a static video stream (e.g., a pre-recorded video). In some embodiments, the one or more video segments comprise a live video stream.

In some embodiments, the received program manifest includes a uniform resource locator (URL) corresponding to each video segment. In some embodiments, the electronic device retrieves a media file from a URL corresponding to the designated video segment.

In accordance with some embodiments, a method for synchronizing video playback is performed at a server having one or more processors, a clock, and memory. The memory stores one or more programs configured for execution by the one or more processors. The process receives a program manifest for a video from a content delivery network and parses the program manifest to identify a timeline for the video. The process then determines a current playback position for the video and a corresponding initial timestamp according to the clock. Periodically (e.g., every 15-30 milliseconds) the process updates the current playback position for the video according to the server clock and the initial timestamp. The server receives many requests from client devices to view the video (e.g., thousands, tens of thousands, or hundreds of thousands). The process receives the requests over a span of time (i.e., not all at the same time). For each request from a respective client device, the process sends the current playback position to the respective client device. In this way, all of the client devices viewing the video are kept in sync.

The methods described here (and below) can be implemented by one or more programs. The programs include instructions for performing the operations of the methods. In accordance with some embodiments, the programs are stored on a non-transitory computer-readable storage medium. The instructions, when executed by an electronic device (e.g., a client device or a server), cause the electronic device to perform the operations of the methods.

Thus, electronic devices are provided with efficient and effective methods for synchronizing a video or data stream across multiple client devices, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIG. 6 is a sample program manifest for streaming media content in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms "first" and "second" are used herein to describe various elements, these elements should not be limited by these terms. These terms are used only to distinguish one element from another. For example, a first data stream segment could be termed a second data stream segment, and, similarly, a second data stream segment could be termed a first data stream segment, without departing from the scope of the various described embodiments. The first data stream segment and the second data stream segment are both data stream segments, but they are not the same data stream segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

Figure 1:
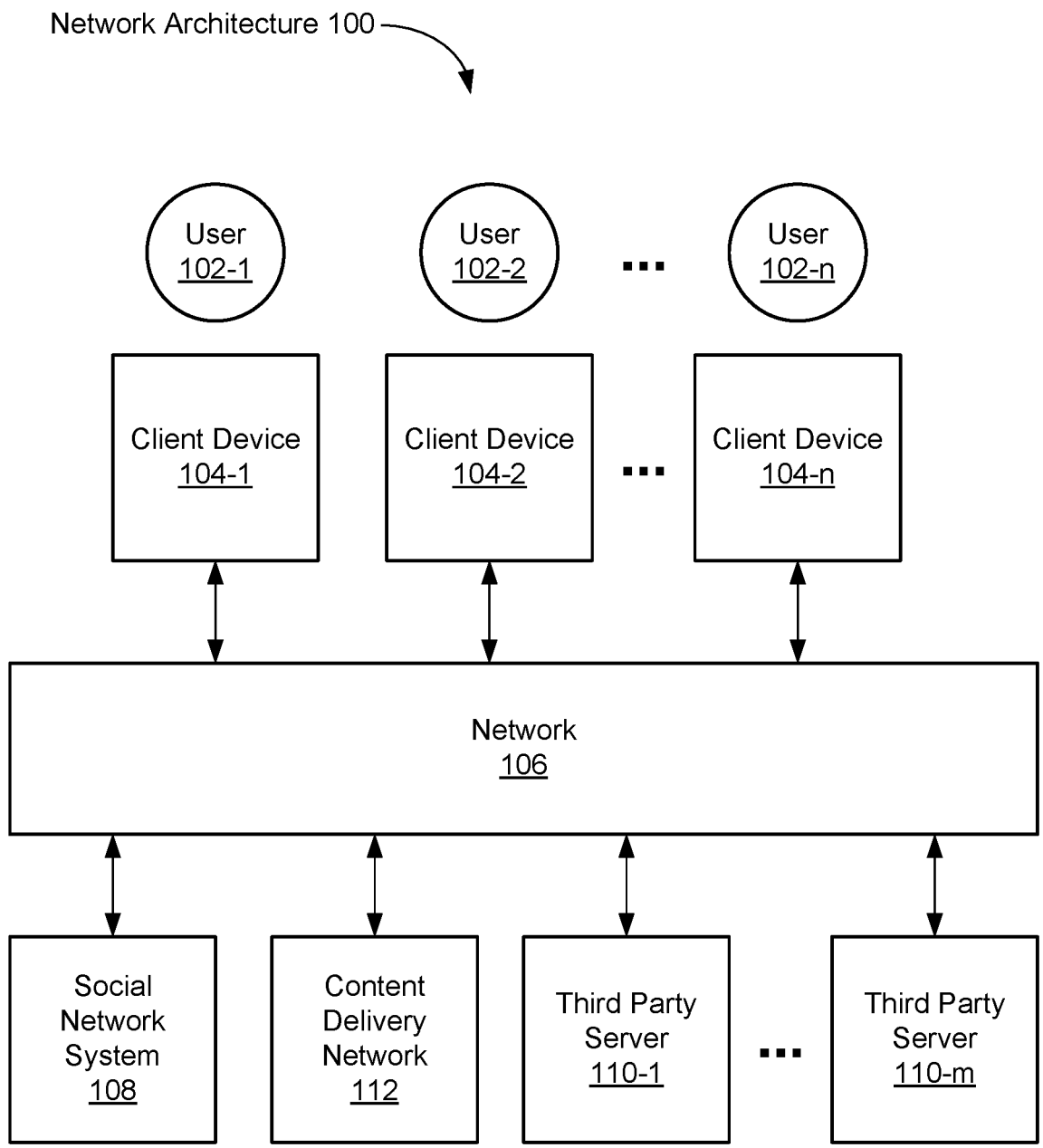
FIG. 1 is a block diagram illustrating a network architecture of a social-network in accordance with some embodiments.

FIG. 1 is a block diagram illustrating a network architecture 100 of a social-network in accordance with some embodiments. The network architecture 100 includes a number of client devices (also called "client systems," "client computers," "clients," or "user devices") 104-1, 104-2, ..., 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, ..., 104-n are computing devices such as smart watches, personal digital assistants, portable media players, smart phones, tablet computers, 2D gaming devices, 3D (e.g., virtual reality) gaming devices, virtual reality headsets, wearable computing devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . , 102-*n* employ the client devices 104-1, 104-2, . . . , 104-*n* to access the social-network system 108 and to participate in corresponding social-networking services provided by the social-network system 108. For example, one or more of the client devices 104-1, 104-2, . . . , 104-*n* execute web browser applications that can be used to access the social-networking service. As another example, one or more of the client devices 104-1, 104-2, . . . , 104-*n* execute software applications that are specific to the social-networking service (e.g., social-networking "apps" running on smart phones or tablets, such as a Facebook social-networking application running on an iPhone®, Android®, or Windows® smart phone or tablet).

Users interacting with the client devices 104-1, 104-2, . . . , 104-*n* can participate in the social-networking service provided by the social-network system 108 by providing and/or consuming (e.g., posting, writing, viewing, publishing, broadcasting, promoting, recommending, or sharing) digital information, such as text comments (e.g., statuses, updates, announcements, replies, location "check-ins," or private/group messages), photos, videos, audio files, links, documents, and/or other electronic content. In some embodiments, users interact with a page, group, event, message board, feed, application, and/or user profile of a social-networking service provided by the social-network system 108. Users of the social-networking service can annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social-network system 108 on the user's behalf. In another example, a software application executing on a mobile client device, with proper permissions, may use a global positioning system (GPS) or other geo-location capabilities (e.g., Wi-Fi or hybrid positioning systems) to determine the user's location and update the social-network system 108 with the user's location (e.g., "At Home," "At Work," or "In San Francisco, Calif."), and/or update the social-network system 108 with information derived from and/or based on the user's location. Users interacting with the client devices 104-1, 104-2, . . . , 104-*n* can also use the social-networking service provided by the social-network system 108 to define groups of users, to communicate and collaborate with each other, and/or to install and run applications provided through the social-networking service.

Streaming media is typically provided by a content delivery network (also known as a content distribution network) 112. The content delivery network 112 is a geographically distributed group of servers, usually including proxy servers and distribution centers. The content delivery network 112 can stream audio, video, or other data in real-time (or near real-time). Some embodiments include two or more distinct content delivery networks 112. The interaction of the content delivery network 112 with client devices 104 and the social network system 108 is described in more detail below with respect to FIG. 7.

In some embodiments, the network architecture 100 also includes third-party servers 110-1, 110-2, . . . , 110-*m*. In some embodiments, a given third-party server 110 is used to host third-party websites that provide web pages to the client devices 104, either directly or in conjunction with the social-network system 108. In some embodiments, the social-network system 108 uses inline frames ("iframes") to nest independent websites within a user's social-network session. In some embodiments, a given third-party server is used to host third-party applications that are used by the client devices 104, either directly or in conjunction with the social-network system 108. In some embodiments, the social-network system 108 enables third-party developers to create applications that are hosted separately by a third-party server 110, but operate within a social-networking session of a user 102 and are accessed through the user's profile in the social-network system 108. Third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by the client devices 104, either directly or in conjunction with the social-network system 108. In some embodiments, a given third-party server 110 is used to provide third-party content (e.g., news articles, reviews, or message feeds).

In some embodiments, a given third-party server 110 is a single computing device, while in other embodiments, a given third-party server 110 is implemented by multiple computing devices working together to perform the actions of a server system (e.g., cloud computing).

Figure 2:
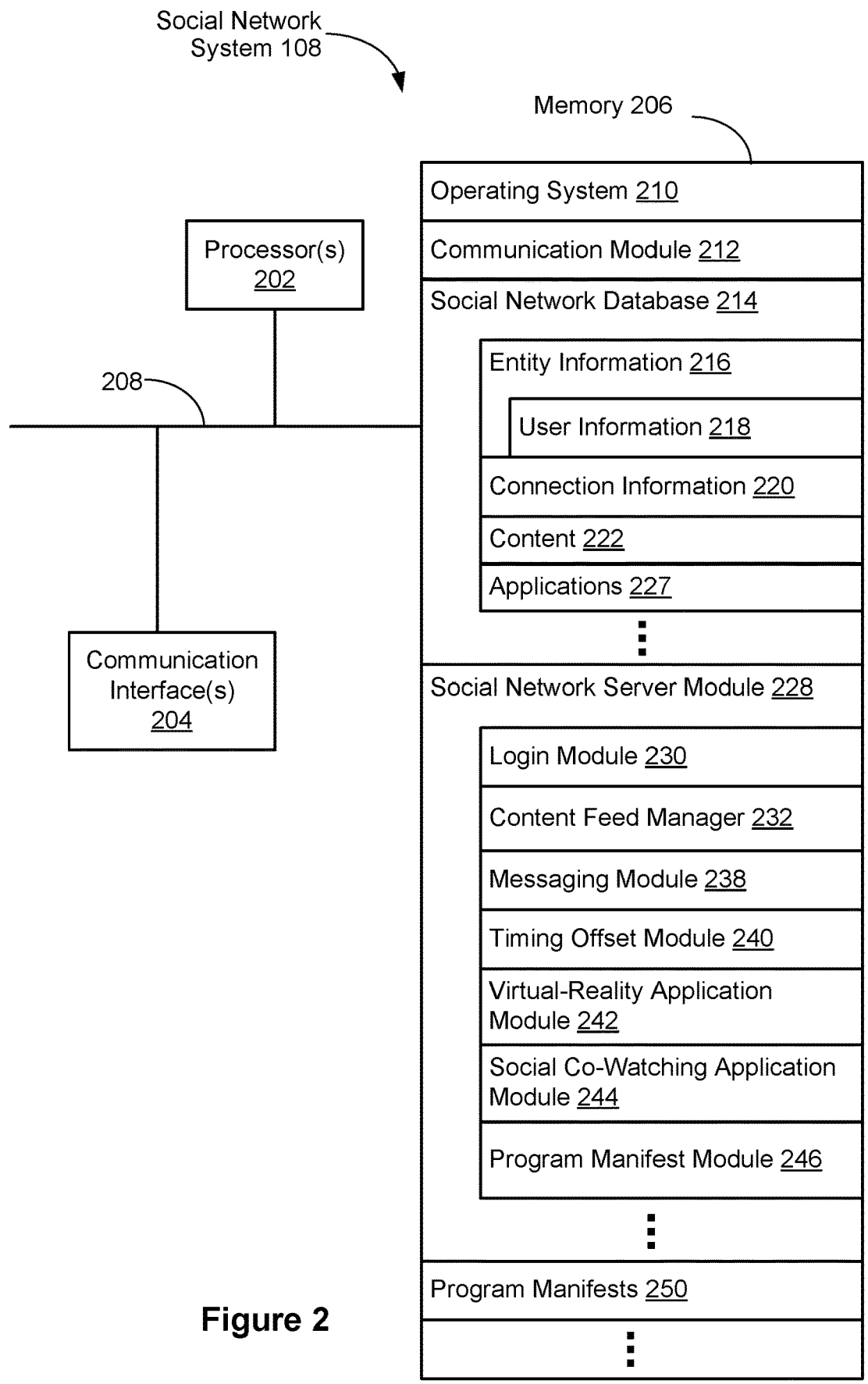
FIG. 2 is a block diagram illustrating a social-network system in accordance with some embodiments.

FIG. 2 is a block diagram illustrating a social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, a mouse, a trackpad, and/or input buttons. Alternatively or in addition, the display device includes a touch-sensitive surface, in which case the display is a touch-sensitive display.

The memory 206 includes high-speed random-access memory, such as DRAM, SRAM, DDR RAM, or other random-access solid-state memory devices, and may include non-volatile memory, such as one or more magnetic disk storage devices, optical disk storage devices, flash memory devices, and/or other non-volatile solid-state storage devices. In some embodiments, the memory 206 includes one or more storage devices remotely located from the processor(s) 202. The memory 206, or alternatively the non-volatile memory device(s) within the memory 206, includes a non-transitory computer-readable storage medium. In some embodiments, the memory 206 or the computer-readable storage medium of the memory 206 stores the following programs, modules, and data structures, or a subset or superset thereof:
- an operating system 210, which includes procedures for handling various basic system services and for performing hardware dependent tasks;
- a network communication module 212, which is used for connecting the social-network system 108 to other computers via the one or more communication network interfaces 204 (wired or wireless) and one or more communication networks 106;
- a social-network database 214, which stores data associated with the social-network, such as:
  - entity information 216 (e.g., user information 218);
  - connection information 220;
  - content 222, such as user content and/or news articles; and
  - applications 227, which are available for downloading by client devices 104;
- a social-network server module 228, which provides social-networking services and related features (e.g., in conjunction with a social co-watching module 340 on a client device 104), which includes:
  - a login module 230, enabling users 102 at client devices 104 to log into the social-network system 108; and
  - a content feed manager 232, which provides content to client devices 104 for display;
- a messaging module 238, enabling communication of messages between users (e.g., the users 102-1 to 102-n in FIG. 1) of a social-networking service (e.g., provided by social-network system 108);
- a timing offset module 240, which determines a timing offset value for each client device 104 for synchronized viewing of data streams or video streams;
- a virtual-reality application module 242;
- social co-watching application module 244. In some embodiments, the social co-watching module includes a video launcher 702, one or more video clients 704, and/or a distribution server 706; and
- a program manifest module 246, which parses program manifests 250 for synchronized data streaming, in order to extract relevant data (e.g., a program date/time). In some embodiments, the social networking server 108 stores the program manifests 250 (e.g., on a file system or in the social networking database 214). In some embodiments, the program manifests are stored only in volatile memory, and discarded shortly thereafter.

The social-network database 214 stores data associated with the social-network in one or more types of databases, such as graph, dimensional, flat, hierarchical, network, object-oriented, relational, and/or XML databases.

In some embodiments, the social-network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at the client devices 104 on corresponding profile pages or other pages in the social-networking service. In some embodiments, the nodes also include pointers or references to other objects, data structures, or resources for use in rendering content (at client devices 104) in conjunction with the rendering of the pages corresponding to the respective nodes.

Entity information 216 includes user information 218, such as user profiles, login information, privacy and other preferences, biographical data, and the like. In some embodiments, for a given user, the user information 218 includes the user's name, profile picture, contact information, birth date, gender, marital status, family status, employment, education, preferences, interests, and/or other demographic information.

In some embodiments, entity information 216 includes information about a physical location (e.g., a restaurant, a theater, a landmark, a city, a state, or a country), real or intellectual property (e.g., a sculpture, a painting, a movie, a game, a song, an idea/concept, a photograph, or a written work), a business, a group of people, and/or a group of businesses. In some embodiments, entity information 216 includes information about a resource, such as an audio file, a video file, a digital photo, a text file, a structured document (e.g., a web page), or an application. In some embodiments, the resource is located in the social-network system 108 (e.g., in the content 222) or on an external server, such as a third-party server 110.

In some embodiments, the connection information 220 includes information about the relationships between entities in the social-network database 214. In some embodiments, the connection information 220 includes edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in the graph database as connection information 220 that indicates that the first user and the second user are friends. In some embodiments, the connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, the content 222 includes text (e.g., ASCII, SGML, or HTML), images (e.g., jpeg, tif, or gif), graphics (e.g., vector-based or bitmap), audio, video (e.g., mpeg), other multimedia, and/or combinations thereof. In some embodiments, the content 222 includes executable code (e.g., games executable within a browser window or frame), podcasts, links, and the like.

In some embodiments, user content includes text comments (e.g., statuses, updates, announcements, replies, location "check-ins," private/group messages), photos, videos, audio files, links, documents, and/or other electronic content. In some embodiments, user content further includes user annotations of information posted by other users of the social-networking service (e.g., endorsements or "likes" of another user's posting, comments on another user's posting, etc.).

In some embodiments, the social-network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 3:
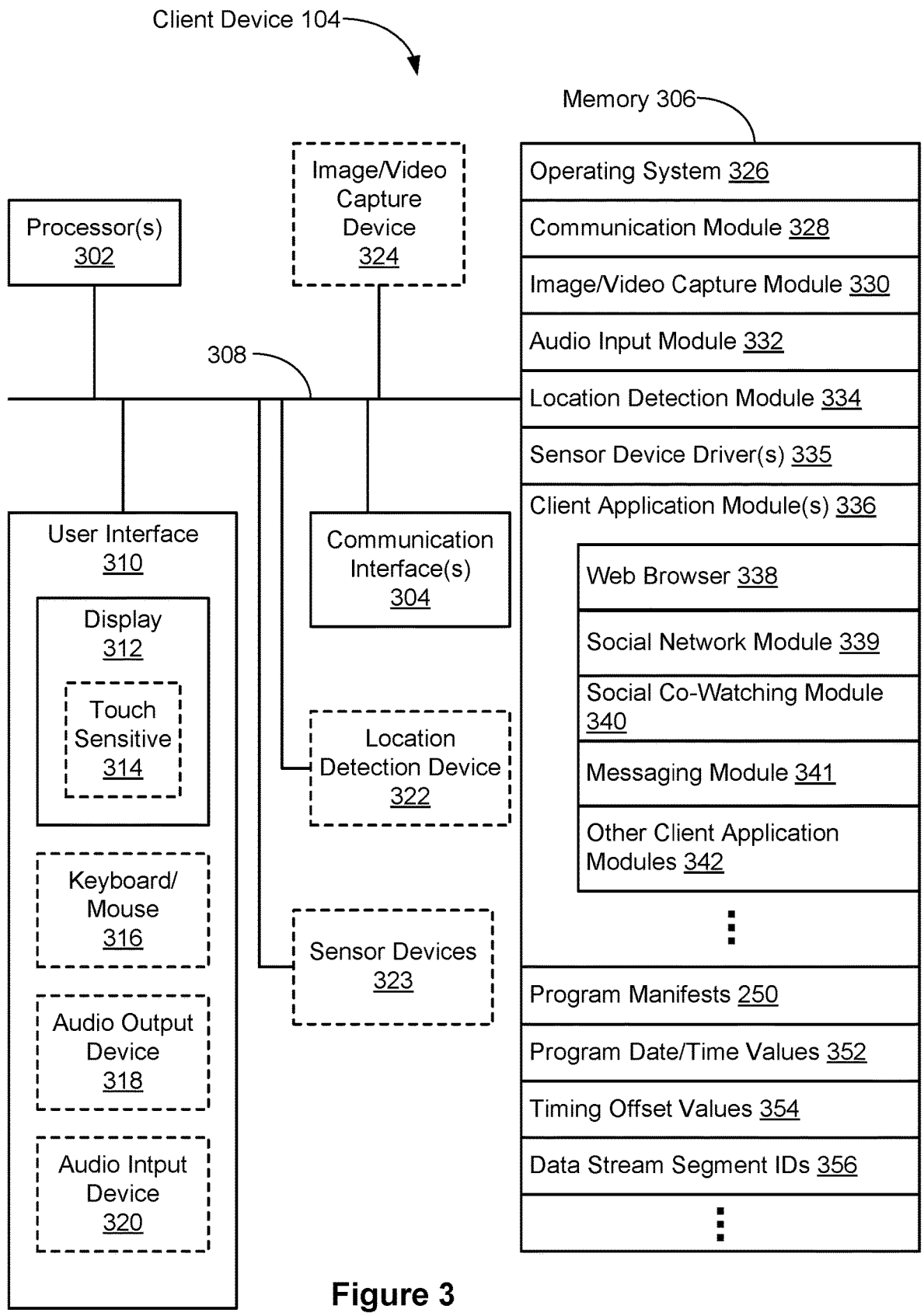
FIG. 3 is a block diagram illustrating a client device in accordance with some embodiments.

FIG. 3 is a block diagram illustrating a client device 104 in accordance with some embodiments. A client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 may include an audio output device 318, such as speakers or an audio output connection connected to speakers, earphones, or headphones. Furthermore, some client devices 104 use a microphone 320 and voice recognition to supplement or replace the keyboard. Optionally, the client device 104 includes an audio input device 320 (e.g., a microphone) to capture audio (e.g., speech from a user). In some embodiments, the client device 104 includes a location detection device 322, such as a GPS (global positioning satellite) or other geo-location receiver, for determining the location of the client device 104. In some embodiments, the client device 104 also includes an image/video capture device 324, such as a camera or webcam.

The memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. In some embodiments, the memory 306 includes one or more storage devices remotely located from the processor(s) 302. The memory 306, or alternatively the non-volatile memory device(s) within the memory 306, includes a non-transitory computer-readable storage medium. In some embodiments, the memory 306 or the computer-readable storage medium of the memory 306 stores the following programs, modules, and data structures, or a subset or superset thereof:

- an operating system 326, which includes procedures for handling various basic system services and for performing hardware dependent tasks;
- a network communication module 328, which is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing an image or video captured by the image/video capture device 324. The image or video may be sent or streamed (e.g., by a client application module 336) to the social-network system 108;
- an audio input module 332 (e.g., a microphone module) for processing audio captured by the audio input device 320. The respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., the social-network client module 339);
- one or more sensor device drivers 335, which enable the client device 104 to access the data collected by one or more sensor devices 323; and
- one or more client application modules 336, including the following modules (or sets of instructions), or a subset or superset thereof:
  - a web browser 338 (e.g., Internet Explorer by Microsoft, Firefox by Mozilla, Safari by Apple, or Chrome by Google) for accessing, viewing, and interacting with web sites (e.g., a social-networking web site provided by the social-network system 108);
  - a social-network module 339, which provides an interface to a social-network (e.g., a social-network provided by social-network system 108) and related features;
  - a social co-watching module 340, which provides an interface to a social-networking system for multiple users to watch one or more data streams simultaneously. The co-watching module 340 receives program manifests 250 from a content delivery network 112 and parses the program manifests 250 to identify program date/time values 352 and data stream segment identifiers 356 (e.g., URLs). The co-watching module receives timing offset values 354 from the social networking server 108. The co-watching retrieves the data stream segments according to the segment identifiers 356 (e.g., based on the URLs) and displays the segments according to the program date/time values and the timing offset values 354;
  - a messaging module 341 (e.g., within the social-network module 339) for sending and receiving messages between one or more users of one or more client devices (e.g., user 102-1 of the client device 104-1 and user 102-2 of the client device 104-2) of a social-networking service; and other client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, music listening, video watching, 2D gaming, 3D (e.g., virtual reality) gaming, electronic and/or book reading.

Each of the above identified modules and applications corresponds to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 206 and/or the memory 306 store a subset of the modules and data structures identified above. In some embodiments, the memory 206 and/or the memory 306 stores additional modules and data structures not described above.

Figure 4:
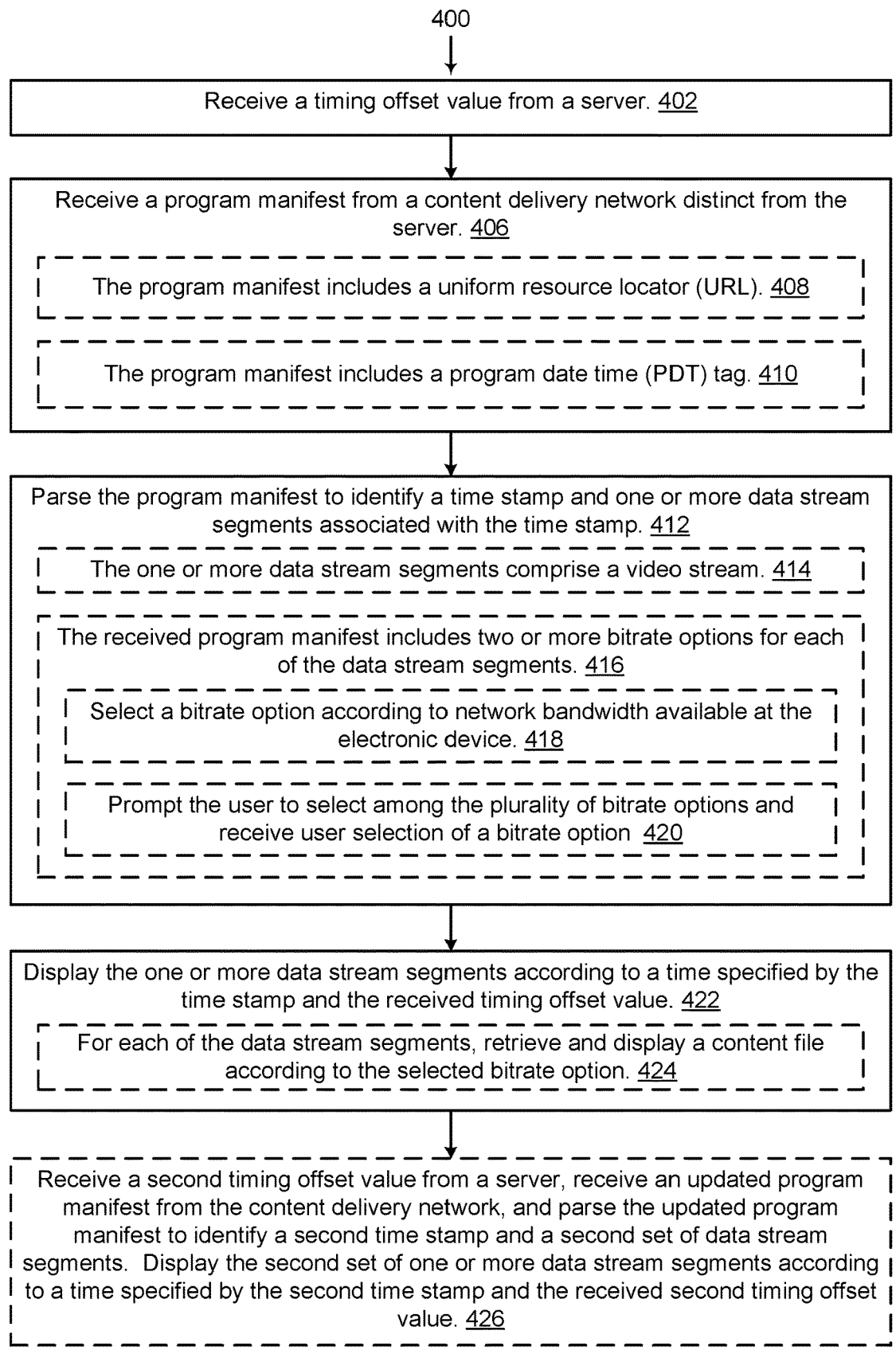
FIGS. 4 and 5 are flow diagrams illustrating methods for synchronizing data streams across multiple client devices, in accordance with some embodiments.
Figure 5:
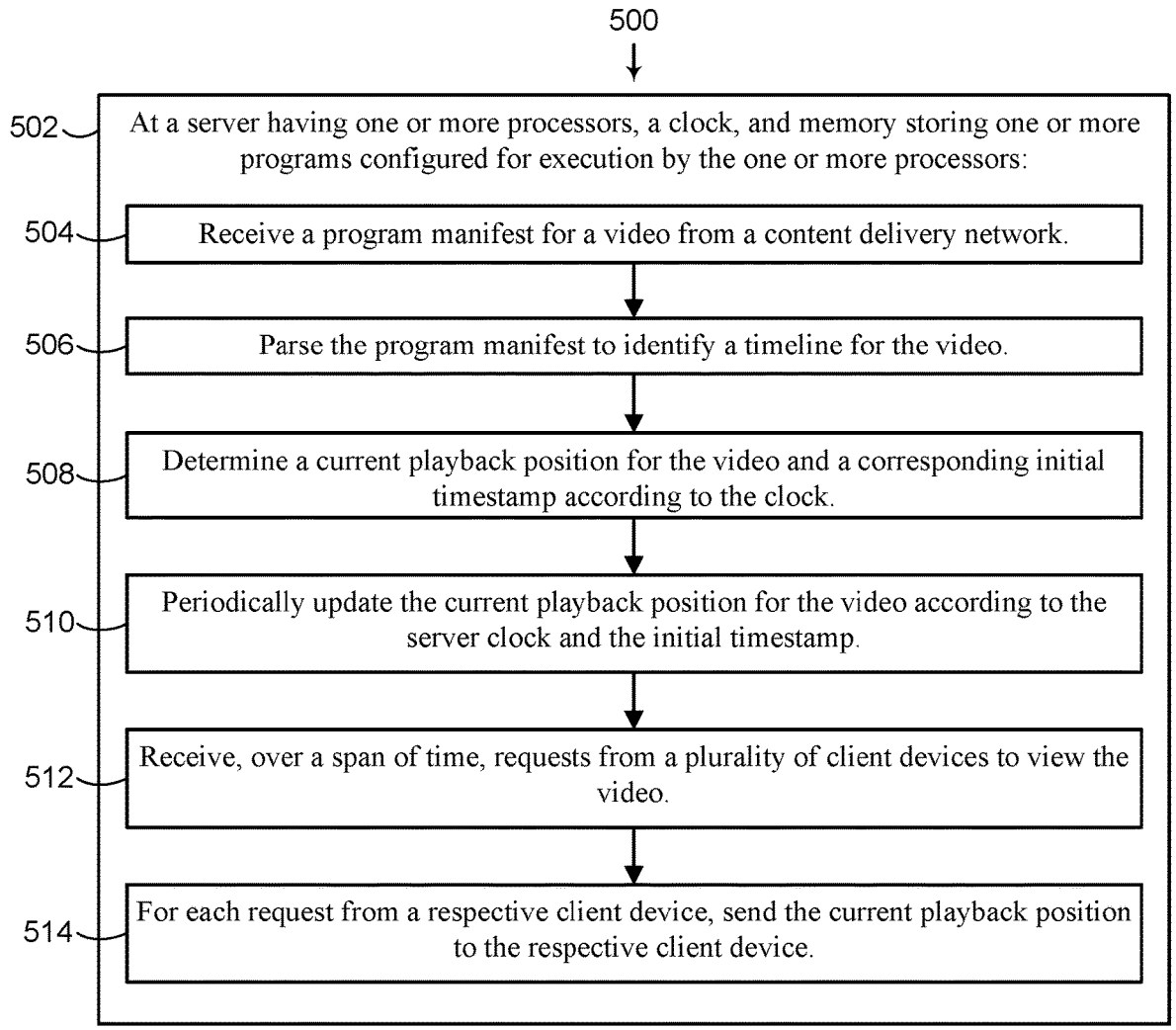

FIGS. 4 and 5 provide flow diagrams for synchronizing data streams across multiple user devices 104, in accordance with some embodiments.

The methods 400 and 500 are performed by a combination of electronic devices (e.g., a client device 104, a content delivery network 112, and a social network server 108). In some embodiments, the methods 400 and 500 are performed by executing instructions stored in the memory of an electronic device (e.g., by a social-network server module 228 or by a client application module 336).

In performing the method 400, an electronic device 104 receives (402) a timing offset value from a server 108. The timing offset value identifies what location (e.g., frame) in the video should be playing. In some embodiments, the timing offset value is determined, at least in part, according to one or more factors. The factors may include the content of the manifest 250 and/or control information from an administration application (e.g., choosing to play the video (or portions) in slow motion, pause the video, or rewind the video).

Figure 7:
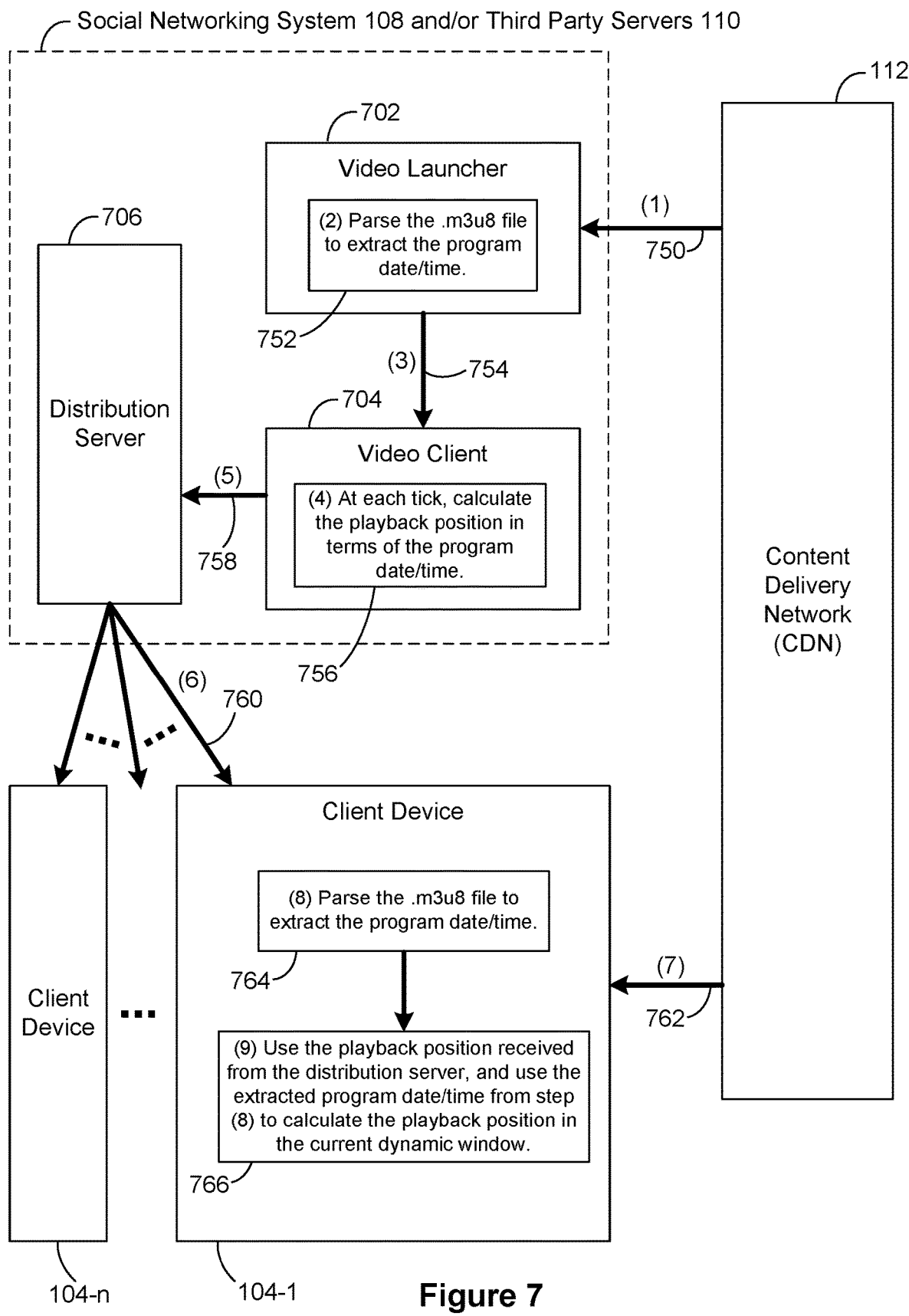
FIG. 7 is a block diagram illustrating a process for synchronizing streams to multiple client devices in accordance with some embodiments.

The electronic device receives (406) a program manifest 250 (e.g., via a program manifest module 246) from a content delivery network 112 distinct from the server 108. For example, FIG. 7 shows a content delivery network 112 sending a program manifest 250 to the electronic device 104. The program manifest 250 may be a text file (e.g., a playlist file having an ".m3u8" extension). A playlist file is used by audio and video players to specify where specific media files are located. FIG. 6 provides a sample program manifest 250 used by some embodiments. In some embodiments, the received program manifest 250 is retrieved at a specified uniform resource locator (URL).

In some embodiments, the received program manifest 250 includes (408) a uniform resource locator (URL). For example, the program manifest 250 may include a URL to specify the download location for each of the stream segments. In some embodiments, the program manifest 250 includes (410) a program date-time tag, such as the HLS (HTTP live streaming) tag EXT-X-PROGRAM-DATE-TIME.

In some embodiments, the electronic device parses (412) the program manifest 250 to identify a time stamp 352 (e.g., using the social co-watching module 340) and one or more data stream segments (e.g., identified by data stream segment IDs 356, such as URLs) associated with the time stamp. In some embodiments, the one or more data stream segments comprise (414) a video stream. In some embodiments, the one or more data stream segments comprises a static video stream (e.g., a pre-recorded video stream). In some other embodiments, the one or more data stream segments comprises a dynamic video stream (e.g., a live video stream).

In some embodiments, the received program manifest 250 includes (416) two or more bitrate options for each of the data stream segments. In some embodiments, the electronic device selects (418) a bitrate option according to network bandwidth available at the electronic device 104. In some embodiments, the electronic device 104 prompts (420) the user to select among the plurality of bitrate options and receives (420) user selection of a bitrate option.

The electronic device then displays (422) the one or more data stream segments according to a time specified by the time stamp and the received timing offset value. For each of the data stream segments, the electronic device 104 retrieves (424) and displays (424) a content file (e.g., an "MPEG-TS" video stream file). Although FIG. 6 illustrates a manifest that specifies MPEG-TS files (".TS"), other streaming video types can be used as well.

When there are multiple bitrate options, the segments are retrieved (424) (and thus displayed) according to the selected bitrate option. For example, the social networking server may provide playback positions for each of multiple potential bitrates. The offsets specified account for the delay/latency associated with each potential bitrate. The electronic device receives the playback positions (as specified by the offsets) for each available bitrate. In this way, each client device 104 is able to select an appropriate bitrate and display the data stream segment at the indicated playback position.

The manifests are updated in-place as new video segments are added. That is, the location for the manifest is specified as a URL. The device 104 retrieves the contents from this URL. At some time later, the device 104 re-retrieves the contents for the manifest using the same URL. The contents may be different for this second retrieval. The client device 104 re-retrieves this manifest periodically (e.g. every 10 seconds).

In some embodiments, the manifest is updated every 15 or 20 seconds, and includes additional segments (e.g., 4 additional five-second segments). In some embodiments, all of the old segments are retained in the manifest. In some embodiments, older segments are removed from the manifest as new segments are added (e.g., retaining a rolling set of 6 five-second segments). In some embodiments, the electronic device 104 receives (426) and/or retrieves a second timing offset value from a server 108, and also receives (426) or retrieves the updated program manifest from the content delivery network 112. The electronic device 104 then parses (426) the updated program manifest to identify a second time stamp. The electronic device displays (426) the one or more data stream segments according to a time specified by the second time stamp and the received timing offset value.

FIG. 5 is a flow diagram of a process 500 for a server system 108 to generate timing offset values for multiple client devices. The method 500 is performed (502) at a server system 108 having one or more processors, a clock, and memory. The memory stores (502) one or more programs configured for execution by the one or more processors. The server 108 receives (504) a program manifest 250 for a video from a content delivery network 112. The server system parses (506) the program manifest to identify a timeline for the video. The server system then determines (508) a current playback position for the video and a corresponding initial timestamp according to the clock. The server system periodically updates (510) the current playback position for the video according to the server clock and the initial timestamp. The server system can support a large number of independent client devices. The requests to view the video do not (in general) all occur simultaneously. Over a span of time the server system receives (512) requests from a plurality of client devices to view the video. For each request from a respective client device, the server system sends (514) the current playback position (e.g., as an offset/timestamp) to the respective client device.

The calculated timing offset values computed by the method 500 can be used as the timing offset values received by the electronic device 104 in the method 400. In general, the methods 400 and 500 are performed concurrently. After the server provides a timing offset value to a client device, the server 108 can retrieve the program manifest 250 again from the content delivery network 112 and compute the next set of timing offset values. The server then uses its own local clock to linearly progress the playback position/timing offset and sends the information to the client devices. The next time the server fetches the program manifest, the new offset value will seamlessly line up with the progressing playback position.

In some embodiments, each electronic device 104 utilizes a "LocalClockSyncedTime" to take the server clock time as a reference point. This process uses the local clock to keep the incoming server time steady. This is used to address network fluctuations. If the network were always consistent, client devices would receive packets from the social network server at the same rate as the real clock, and the process could just feed playback position received from server directly to Sync Media Player. However, due to network latency/fluctuations, client devices receive playback positions that are not continuous, which would cause sync media player to resync often. Disclosed embodiments address this issue by keeping the incoming server time as a reference and run a local timer/tick relative to that server time. Resetting the position occurs only when the times are far off (e.g., greater than a second, or greater than 2 seconds).

FIG. 6 provides a sample program manifest 250 in accordance with some embodiments. The program manifest 250 is a text file with some specific data elements. In this example, the program manifest 250 is a playlist file (e.g., an "m3u8" file). In this example, there are five segments, each about 6 seconds long (creating a dynamic window of 30 seconds).

As illustrated in this example, the fifth line 602 specifies the program date/time. In this case, the date is 2018-05-16, the time is 02:10:14.809, and the offset is 00:00. The sixth line 604 in this file specifies how and where to get the actual content segments for the streaming media. In particular, the content files here are encrypted using 128-bit AES encryption, and the content files are located at the designated address.

The program manifest 250 also specifies the names of the individual content files. Here there are five segments, and the five segments have identical file names except for a portion that includes a sequential number. For example, the first segment in this manifest is specified on the eighth line 606 and has file name "media-uydniwdv5_b4128000_40078.ts". The second segment is specified on the tenth line 608, and the file name ends with " . . . 79.ts". Because the program manifest 250 has a well-defined structure, the program manifest module 246 and the social co-watching module 340 are able to quickly identify the relevant data.

The techniques described herein are not limited to the specific format shown in FIG. 6.

This sample program manifest can be used to illustrate the behavior that occurs without the disclosed synchronization techniques. Suppose User A starts playing a live stream using ExoPlayer (or other suitable video player). The player starts playing the streaming video from the beginning of the third segment media-uydniwdv5_b4128000 40080.ts (the starting segment depends on the media player implementation). After 5 seconds, User A will be playing at the fifth second of the segment media-uydniwdv5 b4128000_40080.ts. Now suppose User B starts playing the stream at this point, also using ExoPlayer (or the same video player as User A). User B would get same the same playlist as User A from the content delivery network 112. Because User B is also using ExoPlayer, the logic in the player will start User B at the beginning of media-uydniwdv5_b4128000_40080.ts. This puts User B five seconds behind User A. From this point User A and User B will always be off by 5 seconds. In general, any two users can be off by as much as the segment size.

By generating appropriate timing offsets for each client device, the disclosed techniques are able to get all of the client devices 104 in sync, avoiding the default behavior.

FIG. 7 is a block diagram illustrating a process for synchronizing streams to multiple client devices in accordance with some embodiments. The server (e.g., the social co-watching application 244) loads the manifest and computes the desired synchronization timestamps, which it then shares with all clients. This process is repeated periodically to accommodate updates to the manifest. In some embodiments, the video launcher 702 retrieves/receives (750) a program manifest 250 (e.g., an "m3u8" file) from the content delivery network (CDN) 112. In some embodiments, the video launcher 702 runs the Open vSwitch software, which is a distributed virtual multilayer switch. The video launcher 702 then parses (752) the program manifest 250 to extract the program date/time. As illustrated in FIG. 6, some program manifests 250 use the tag # EXT-X-PROGRAM-DATE-TIME to store the program date/time. In the example of FIG. 6, the extracted program date/time is 2018-05-16 at 02:10:14.809. Using the extracted program date/time, the video launcher 702 then launches (754) a video client 704 (e.g., a stadium video client) and provides (754) the video client 704 with the extracted program date/time. Typically there is a single video launcher application, which launches a separate video client 704 for each distinct video.

The video client 704 then calculates (756) the playback position relative to the program date/time. That is, the position is calculated (756) as an offset from the program date/time. In some embodiments, the calculation of the timing offset occurs at each tick (e.g., 60 times per second or 120 times per second) in order to progress the playback position. In some embodiments, the calculation uses a local clock accessed by the virtual client 704.

The video client 704 relays (758) the timing offset to a distribution server 706, which distributes (760) the timing offset information to the client devices 104-1, . . . , 104-n. The client device 104-1 independently gets (762) the program manifest 250 from the content delivery network 112 and parses (764) the program manifest 250 to extract the program date/time. At this point the client device can combine the information it has to play the stream at the proper position. In particular, the client device (e.g., the social co-watching module 340) uses the playback position received from the distribution server 706 and uses the extracted program date/time from step 8 (764) to calculate (766) the playback position in the current dynamic window. In some embodiments, the calculation comprises adding the timing offset value to the program date/time.

In some embodiments, the video launcher 702, the video client 704, and the distribution server 706 are components of the social co-watching application 244.

The data within a manifest 250 can be stored in a variety of formats. Two of the common formats are HLS (HTTP Live Streaming) and DASH (Dynamic Adaptive Streaming over HTTP). Within the various formats, the data describing the video can be stored in several ways. Three important characteristics are: (1) whether or not the manifest specifies a program date-time; (2) whether the manifest is complete (e.g., a static video) or dynamic (e.g., a live video); and (3) for dynamic manifests, whether the manifests retain all old segments or delete old segments after a threshold amount of time (e.g., retain only enough segments for about 30 seconds of video content).

In a first example, using HLS, the playlist 250 contains "EXT-X-PLAYLIST-TYPE: EVENT", which indicates that new content is added to the playlist periodically without removing the old content. In this example, all content within the playlist is labeled with metadata indicating the length of each segment in seconds. The available content in the playlist has a timeline starting at 0 seconds and an ending time that is the sum of the segment lengths. The video client 704 selects an initial playback timestamp within the timeline. Over time, new content is added to the manifest. For example, when 30 seconds have elapsed, there are an additional 30 seconds of content available for viewing. The video client 704 then periodically tells the client devices 104 that the current playback timestamp is the initial playback timestamp plus the additionally elapsed time. This process is repeated multiple times (e.g., at a predefined rate) until there is no new content that is added to the manifest.

In a second example, using HLS, the playlist 250 contains "EXT-X-PLAYLIST-TYPE: VOD", which indicates that the playlist contains all of its content (it is complete). For example, this description can be used for video on demand (VOD). Each of the segments is labeled with metadata indicating its length in seconds. The available content in the playlist has a timeline ranging from 0 up to the sum of the segment lengths. The video client 704 selects an initial timestamp within the timeline. The video client 704 periodically updates the client devices 104 to specify a current playback timestamp equal to the initial timestamp plus the length of time that has passed.

In these first two HLS examples, there is no specified program date-time in the manifest 250, so the timeline starts at 0. The video client is able to specify the playback location as the number of seconds (e.g., as measured in milliseconds) from when it started playing the video. In this case, the number of seconds can be considered either as an offset (offset from 0) or as an absolute playback position.

In a third HLS example, the playlist 250 contains the tag "EXT-X-PROGRAM-DATE-TIME". New content is added to the manifest periodically, and old content is removed as new content is added. The specified program date-time is the timestamp for the first segment in the playlist 250, and the timestamp of each subsequent segment is the program date-time of the first segment plus the lengths of all the preceding segments. For example, if the first segment is 6 seconds long, then the timestamp for the second segment is the timestamp of the first segment plus 6 seconds. In this way, each segment within the program manifest has a designated timestamp. In this case, the timeline for the manifest starts with the program date-time specified, and ends with a timestamp computed by adding the sum of the segment lengths to the program date-time. The video client 704 picks an initial playback timestamp within that timeline. In general, new content is added to the manifest fast enough to keep up with demand. For example, when 30 seconds elapse, there is an additional 30 seconds of content available for viewing. The video client 704 periodically tells the client devices 104 that the current playback timestamp is the initial playback timestamp plus the additional elapsed time (e.g., an additional 30 seconds). This process is repeated multiple times (e.g., at a predefined rate) until there is no new content that is added to the manifest.

The work that the client device 104 has to do is the inverse of what the server does. That is, if the server is sending timestamps according to one of the three examples given above. The client device 104 takes this timestamp and uses it to look up which segment of content to be playing using its own timeline. Then, within that segment, what position should be playing (e.g., how many seconds into the segment should be playing). After a client device gets started playing a video, it continues to receive new timestamps. The client device also tracks what it is playing. Due to a variety of factors, the timestamp received from the video client 704 may not exactly match where the client device 104 is playing. When the difference is small, embodiments typically let the client device continue uninterrupted. However, if the difference is sufficiently large, the client device jumps to the location specified by the received timestamp and resumes playing from there. For example, suppose the client device is currently playing at time X but the server has asked it to play at time Y. Suppose the threshold is T (e.g., one second or two seconds). If |X−Y|>T, jump to the new position specified by Y and resume playing. Otherwise, just continue playing from the current position.

Figure 8A:
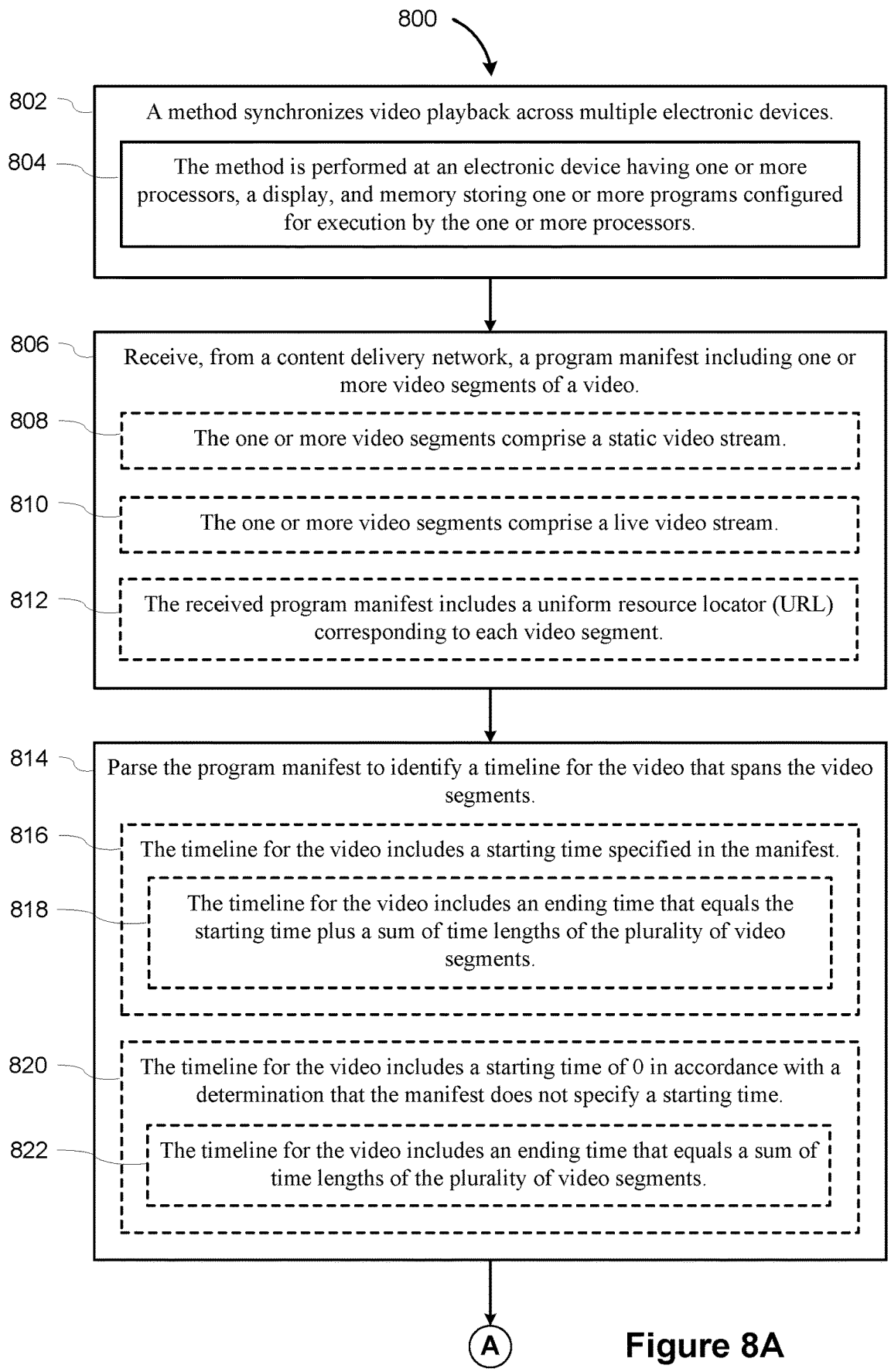
FIGS. 8A-8C provide a flowchart of a process for synchronizing a video stream across multiple client devices according to some embodiments.
Figure 8B:
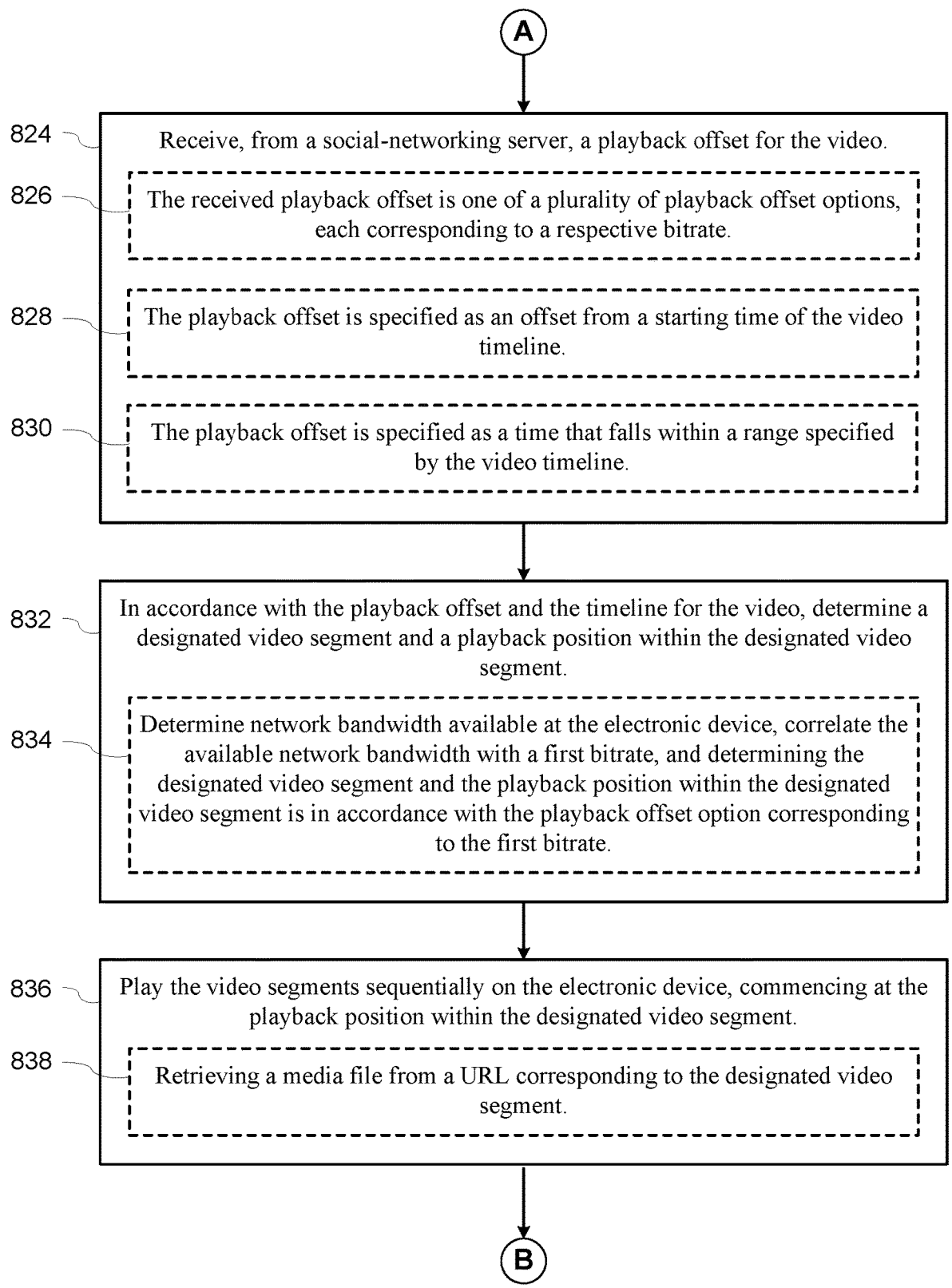
Figure 8C:
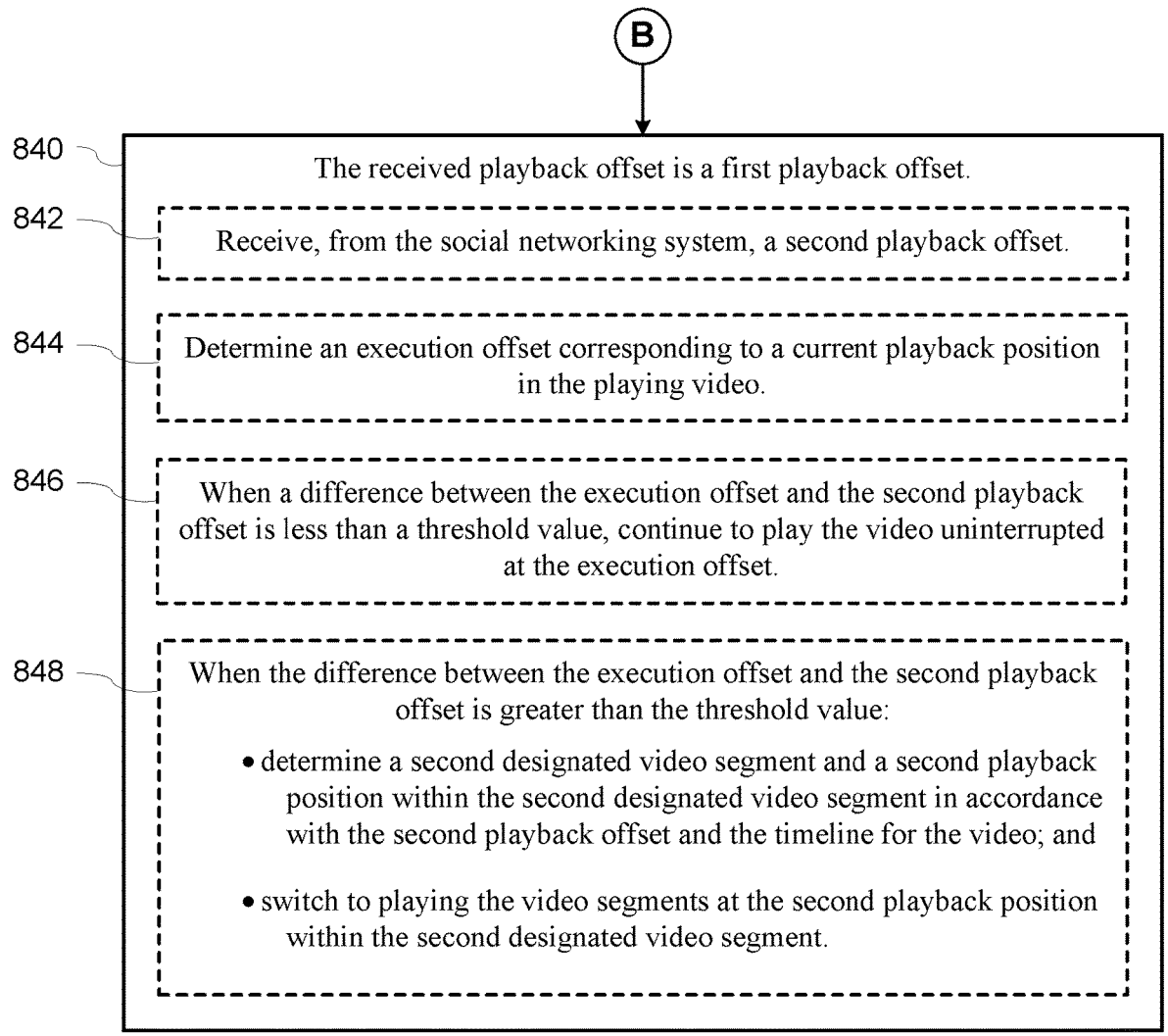

FIGS. 8A-8C provide a flowchart of a process (800) for synchronizing (802) video playback across multiple electronic devices. The process is performed (804) at an electronic device (e.g., a client device) having one or more processors, a display, and memory storing one or more programs configured for execution by the one or more processors.

The process receives (806), from a content delivery network, a program manifest 250 including one or more video segments of a video. This is illustrated by the seventh step 762 in FIG. 7. In some instances, the one or more video segments comprise (808) a static video stream (e.g., video on demand). In some instances, the one or more video segments comprise (810) a live video stream. In some embodiments, the received program manifest 250 includes (812) a URL corresponding to each video segment, as illustrated in FIG. 6. In some embodiments, the specified URL is specified as a based directory 604 plus an individual filename 606 or 608.

The process parses (814) the program manifest 250 to identify a timeline for the video that spans the video segments. This is illustrated by the eighth step 764 in FIG. 7. In some embodiments, the timeline for the video has (816) a starting time specified in the manifest, as illustrated by the third HLS example above. In this case, the timeline for the video has (818) an ending time that equals the starting time plus a sum of time lengths of the plurality of video segments. In some embodiments, the timeline for the video hass (820) a starting time of 0 when the manifest does not specify a starting time. This scenario is illustrated by the first two HLS examples above. In this case, the timeline for the video has (822) an ending time that equals a sum of time lengths of the plurality of video segments.

The process receives (824) a playback offset for the video from a social-networking server, as illustrated by the sixth step 760 in FIG. 7. In some embodiments, the received playback offset is (826) one of a plurality of playback offset options, each corresponding to a respective bitrate. Multiple bitrate options are provided for a variety of reasons relating to network connectivity of the electronic device. First, the content itself may be provided at different levels of quality and/or resolution, so the connectivity to the server hosting the content can determine the appropriate bitrate option. For example, the connection may not be able to keep up with a live feed if the bandwidth is not good enough. Multiple bitrate options can also be provided to account for connectivity to the social networking server. If there is a substantial latency to a client device, it may already be past the designated playback position by the time it receives the playback offset. To address this, some embodiments specify different playback positions for different bitrates. Because of the latency in receiving the playback offsets, a device with a lower bitrate processes the message later, but is kept in sync because the lower bitrate has a different playback offset.

In some implementations, the playback offset is specified (828) as an offset from a starting time of the video timeline. In some embodiments, the playback offset is specified (830) as a time that falls within a range specified by the video timeline (absolute addressing versus relative addressing). In some embodiments, both techniques are supported. In some of these embodiments, the technique used depends on how the data is stored in the manifest 250.

In accordance with the playback offset and the timeline for the video, the process determines (832) a designated video segment and a playback position within the designated video segment. When multiple bitrate options are available, some implementations determine (834) network bandwidth, connectivity, and/or latency at the electronic device, and correlate this network data with a first bitrate. The process then determines the designated video segment and the playback position within the designated video segment is in accordance with the playback offset option corresponding to the first bitrate.

The process then plays (836) the video segments sequentially on the electronic device, commencing at the playback position within the designated video segment. In general, the media content played is retrieved (838) from a URL corresponding to the designated video segment.

In order to keep the client devices 104 synchronized, the server system continues to send messages that identify the current position in the video that should be playing. Because of this, the received playback offset identified above is (840) a first playback offset. The process receives (842) a second playback offset from the social networking system. The process also determines (844) an execution offset corresponding to a current playback position in the playing video. In general, the second playback offset is close to the actual execution offset, and as long as they are close, the client device just continues playing from the current playback offset. To test closeness, some embodiments compute the absolute difference (e.g., |X−Y|, where X is the current playback offset and Y is the received second playback offset). When the difference between the execution offset and the second playback offset is less than a threshold value, the process continues to play (846) the video uninterrupted at the execution offset.

However, when the difference between the execution offset and the second playback offset is greater than the threshold value, the process determines (848) a second designated video segment and a second playback position within the second designated video segment in accordance with the second playback offset and the timeline for the video. The process then switches (848) to playing the video segments at the second playback position within the second designated video segment. Note that the "second designated video segment" could be the same as the "first designated video segment" here.

Although some of the various drawings illustrate a number of logical stages in a particular order, stages that are not order dependent may be reordered and other stages may be combined or broken out. Furthermore, some stages may be performed in parallel and/or simultaneously with one other. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A server system, comprising:
one or more processors;
a clock; and
memory storing one or more programs configured for execution by the one or more processors, the one or more programs comprising instructions for:
receiving a program manifest for a video from a content delivery network, wherein the video includes a plurality of video segments;
parsing the program manifest to identify a timeline for the video;
determining a current playback position for the video and a corresponding initial timestamp according to the clock;
periodically updating the current playback position for the video according to the clock and the initial timestamp;
receiving, over a span of time, requests from a plurality of client devices to view the video; and
for each request from a respective client device, sending the current playback position to the respective client device.

2. The server system of claim 1, further comprising, for each request from a respective client device, sending a plurality of playback offset options, each corresponding to a respective bitrate based on network bandwidth available at the respective client device, wherein each playback offset option specifies a respective current playback position.

3. The server system of claim 1, wherein the timeline for the video includes a starting time specified in the program manifest.

4. The server system of claim 3, wherein the timeline for the video includes an ending time that equals the starting time plus a sum of time lengths of the plurality of video segments.

5. The server system of claim 1, wherein the timeline for the video includes a starting time of 0 in accordance with a determination that the program manifest does not specify a starting time.

6. The server system of claim 5, wherein the timeline for the video includes an ending time that equals a sum of time lengths of the plurality of video segments.

7. The server system of claim 1, wherein the current playback position is specified as an offset from a starting time of the video.

8. The server system of claim 1, wherein the current playback position is specified as a time that falls within a range specified by the timeline of the video.

9. The server system of claim 1, wherein the plurality of video segments comprise a static video stream.

10. The server system of claim 1, wherein the plurality of video segments comprise a live video stream.

11. The server system of claim 1, wherein the program manifest includes a respective uniform resource locator (URL) corresponding to each video segment.

12. A method for synchronizing video playback, comprising:
at a server having one or more processors, a clock, and memory storing one or more programs configured for execution by the one or more processors:
receiving a playlist for a video from a content delivery network, wherein the video includes a plurality of video segments;
parsing the playlist to identify a timeline for the video;
determining a current playback position for the video and a corresponding initial timestamp according to the clock;
periodically updating the current playback position for the video according to the clock and the initial timestamp;
receiving, over a span of time, requests from a plurality of client devices to view the video; and
for each request from a respective client device, sending the current playback position to the respective client device.

13. The method of claim 12, further comprising, for each request from a respective client device, sending a plurality of playback offset options, each corresponding to a respective bitrate based on network bandwidth available at the respective client device, wherein each playback offset option specifies a respective current playback position.

14. The method of claim 12, wherein the timeline for the video includes a starting time specified in the playlist.

15. The method of claim 14, wherein the timeline for the video includes an ending time that equals the starting time plus a sum of time lengths of the plurality of video segments.

16. The method of claim 12, wherein the timeline for the video includes a starting time of 0 in accordance with a determination that the playlist does not specify a starting time.

17. The method of claim 16, wherein the timeline for the video includes an ending time that equals a sum of time lengths of the plurality of video segments.

18. The method of claim 12, wherein the current playback position is specified as an offset from a starting time of the video.

19. The method of claim 12, wherein the current playback position is specified as a time that falls within a range specified by the timeline of the video.

20. A non-transitory computer-readable storage medium storing one or more programs configured for execution by one or more processors of a server system, the one or more programs including instructions for:
receiving a program manifest for a video from a content delivery network, wherein the video includes a plurality of video segments;
parsing the program manifest to identify a timeline for the video;
determining a current playback position for the video and a corresponding initial timestamp according to a clock of the server system;
periodically updating the current playback position for the video according to the clock and the initial timestamp;
receiving, over a span of time, requests from a plurality of client devices to view the video; and
for each request from a respective client device, sending the current playback position to the respective client device.

* * * * *